(12) United States Patent
Ferreira

(10) Patent No.: US 6,285,485 B1
(45) Date of Patent: Sep. 4, 2001

(54) INDUCTION MICROSCANNER

(75) Inventor: Luiz Otavio S. Ferreira, Campinas (BR)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 09/582,604
(22) PCT Filed: Jan. 11, 1999
(86) PCT No.: PCT/US99/00564
§ 371 Date: Jun. 28, 2000
§ 102(e) Date: Jun. 28, 2000
(87) PCT Pub. No.: WO99/36825
PCT Pub. Date: Jul. 22, 1999

Related U.S. Application Data

(63) Continuation of application No. 09/008,386, filed on Jan. 16, 1998, now abandoned.
(51) Int. Cl.$^7$ .................................................. G02B 26/08
(52) U.S. Cl. ........................ 359/198; 359/196; 359/224; 310/36
(58) Field of Search ................... 359/198, 199, 359/223, 224, 225, 292, 298, 305; 310/36, 211

(56) References Cited

U.S. PATENT DOCUMENTS 5,606,447  2/1997  Asada et al. ..................... 359/199

FOREIGN PATENT DOCUMENTS

9500860-P  2/1995  (BR) .

OTHER PUBLICATIONS

Bassous, E., "Fabrication of Novel Three–Dimensional Microstructures by the Anisotropic Etching of (100) and (110) Silicon," IEEE Trans. on Electron. Devices, vol. ED–25, pp. 1178–1185 (1978).

(List continued on next page.)

*Primary Examiner*—Darren Schuberg
(74) *Attorney, Agent, or Firm*—John H. Runnels

(57) ABSTRACT

A micro-electromechanical scanner is disclosed for the efficient, controlled deflection of light beams. The device comprises a moving rotor, a suspension system, and a stator. The rotor comprises a closed-circuit coil and a mirror. The suspension system may be, for example, a set of torsion bars on which the rotor is mounted. The stator may be, for example, a rectangular frame holding the suspension system. When placed in a constant magnetic field and excited by an alternating magnet field, the rotor oscillates at the frequency of the alternating magnetic field, All else being equal, the highest deflection angles occur at the natural mechanical resonance frequency of the rotor-suspension combination. Compared to conventional devices, the novel device can be smaller, can be less expensive, can consume less power, and may exhibit higher deflection angles over a given time scale than other micromechanical devices operating on different actuation principles. The novel device may be used, for example, to replace the scanning devices currently used in laser printers, laser bar-code readers, and laser image projectors (e.g., large screen televisions). The control electronics may optionally be manufactured on the same device, eliminating the need for a separate controller and reducing costs.

37 Claims, 6 Drawing Sheets

OTHER PUBLICATIONS

Bean, K., "Anisotropic Etching of Silicon," IEEE Trans. on Electron. Devices, vol. ED–25, pp. 1185–1193 (1978).

Ferreira, L., "Microscanner de Silício," (in Portuguese), doctoral thesis presented at Universidade Estadual de Campinas, Campinas, São Paulo, Brazil (1994) (with partial translation).

Ferreira, L. et al., "Micromechanical Galvanometric Light Beam Scanner," Proc. 1996 Science and Technology Workshop, Center for Advanced Microstructures and Devices, Baton Rouge, Louisiana (Apr. 1996).

Gustafsson, K. et al., "A Silicon Light Modulator," J. Phys. E: Sci. Instrum., vol. 21, pp. 680–685 (1988).

Peterson, K., "Silicon as a Mechanical Material," Proceedings of the IEEE, vol. 70, No. 5, pp. 420–457 (1982).

Petersen, K., "Silicon Torsional Scanning Mirror," IBM J. Res. Develop., vol. 24, pp. 631–637 (1980).

Price, J., "Anisotropic Etching of Silicon with KOH–H2O–Isopropyl Alcohol," ECD Semiconductor Silicon, pp. 339–353 (1973).

INDUCTION MICROSCANNER

This application is a continuation of Ser. No. 09/008,386 filed Jan. 16, 1998 now abandoned.

TECHNICAL FIELD

This invention pertains to scanners for controlling the direction of propagation of a light beam, particularly to micro-mechanical scanners for controlling the direction of propagation of a light beam.

BACKGROUND ART

Scanners are used to control the direction of propagation of a light beam. Scanners are frequently found in devices such as laser printers and bar-code readers. The three general categories of previous scanner devices are mechanical, electro-optical, and ultrasonic devices. The most commonly used devices have been mechanical scanners, which are based upon a mirror or set of mirrors attached to the turning axis of an electromagnetic actuator such as a galvanometer or electric motor. Limitations of prior mechanical scanners include their relatively large size, high power consumption, and limited scanning frequencies. Prior galvanic scanners are typically 20×20×50 mm or larger, with a mass exceeding 50 grams (excluding control electronics), a typical power consumption of 1 Watt, and a scanning frequency below 8 kHz. Prior rotating polygon scanners (a type of mechanical scanner employing mirror-faced polygons attached to the rotating axis of an electric motor) are typically 100×100×90 mm or larger (excluding control electronics), with a typical power consumption of 5 Watts or more, and a scanning frequency below 10 kHz.

Prior electro-optical and ultrasonic devices are expensive, have limited deflection angles, and experience high attenuation of reflected light beams. Their scanning frequencies can be higher, however, in the MHz range.

Micro-electromechanical scanners based on electrostatic actuation of a moving mirror have been reported, but these devices have achieved only small deflection angles and low efficiencies as compared to electromagnetic devices of approximately the same resonance frequency and size. See K. Petersen, "Silicon Torsional Scanning Mirror," *IBM J. Res. Develop.*, vol. 24, pp. 631–637 (1980); and K. Gustafsson et al., "A Silicon Light Modulator," *J. Phys. E: Sci. Instrum.*, vol. 21, pp. 680–685 (1988). These references demonstrated that, while silicon is an excellent structural material for manufacturing a monolithic resonant scanning mirror with very good fatigue resistance (i.e., with a long working lifetime), electrostatic actuation was inefficient for millimeter-scale devices, producing mechanical deflection angles of only about 2°.

The present inventor has previously reported micro-mechanical scanners using electromagnetic actuation via a coil attached to a rotor, where the coil was electrically connected to an external power supply. The interaction between a constant external magnetic field and the electric current flowing in the coil generated a torque that deflected the rotor of millimeter-scale devices to mechanical deflection angles of 10°. These prior devices experienced mechanical fatigue in the conductive tracks used to supply electric power to the moving coil after 100 hours of operation at 1 kHz and 10° peak-to-peak mechanical deflection of the mirror. These fatigue problems limited the utility of these devices. L. Ferreira, "Microscanner de Silício" (in Portuguese), doctorate thesis presented at Universidade Estadual de Campinas, Campinas, São Paulo, Brazil (1994); L. Ferreira et al., "Micromechanical Galvanometric Light Beam Scanner," *Proc. 1996 Science and Technology Workshop, Center for Advanced Microstructures and Devices*, Baton Rouge, La. (April 1996); laid-open Brazilian patent application number 9500860-8 (in Portuguese), filed Feb. 21, 1995.

DISCLOSURE OF INVENTION

A micro-electromechanical scanner has now been discovered for the efficient, controlled deflection of light beams. The novel device may be built on a micro-mechanical scale, and comprises a moving rotor, a suspension system, and a stator. The rotor comprises a closed-circuit coil and a mirror. Mechanical deflection angles of 10° or more may be achieved, corresponding to optical deflection angles (i.e., the deflection angle of the scanned light beam) of 20° or more. The suspension system may be, for example, a set of torsion bars on which the rotor is mounted. The stator may be, for example, a rectangular frame holding the suspension system. When placed in a constant magnetic field and excited by a magnetic field that causes a change in the magnetic flux through the rotor's coil, the rotor oscillates at the frequency of the exciting magnetic field. The exciting magnetic field may be a constant direction, amplitude-modulated magnetic field generated, for example, from an inductor; or the exciting magnetic field may be generated, for example, by a magnetic circuit such as is shown in FIG. 3 (discussed below). Mechanical scanning oscillation frequencies of 10 kHz, 12 kHz, 15 kHz, 20 kHz, or higher may be achieved.

All else being equal, the highest deflection angles occur at the natural mechanical resonance frequency of the rotor-suspension combination. A light beam reflected from the rotor's mirror is deflected at twice the deflection angle of the rotor. A prototype device has been constructed, measuring 12×25×9 mm, with a power consumption less than 1 Watt, and exhibiting a mechanical deflection angle of 0.4 degrees peak-to-peak at an oscillation frequency of 1606 Hz when excited by an external coil carrying a sinusoidal current of 100 mA and immersed in a static magnetic field of 550 gauss. The deflection angle may be increased, for example, by increasing the strength of the constant magnetic field, or by increasing the strength of the alternating magnetic field, or both. Compared to conventional devices, the novel device can be smaller, can be less expensive, can consume less power, and may exhibit higher deflection angles over a given time scale than other micromechanical devices operating on different actuation principles. The novel device may be used, for example, to replace the scanning devices currently used in laser printers, laser bar-code readers, and laser image projectors (e.g., large screen televisions). The control electronics may optionally be manufactured on the same chip as the device, eliminating the need for a separate controller and further reducing costs.

The novel inductive microscanner overcomes the fatigue problem of the inventory's prior micro-mechanical scanner by eliminating the power supply tracks entirely, while still maintaining the strong deflection torque desirable in millimeter-scale devices. Electric power is delivered to the moving coil by electromagnetic induction generated by an external coil or other magnetic circuit.

Less preferably, the closed coil could be replaced by a continuous area of a conductive material (such as the interior of a rectangle), as an alternating magnetic field will still induce a current in such a continuous area, albeit less efficiently.

Another alternative is to replace the alternating magnetic field with a magnetic field that rotates through a limited angle around the rotor, producing a change in the magnetic flux through the rotor's coil and inducing a current in the coil.

In another alternative, the electric circuits and magnetic fields may be eliminated, and the rotational driving force may be provided by acoustic waves.

MODES FOR CARRYING OUT THE INVENTION

Figure 1:
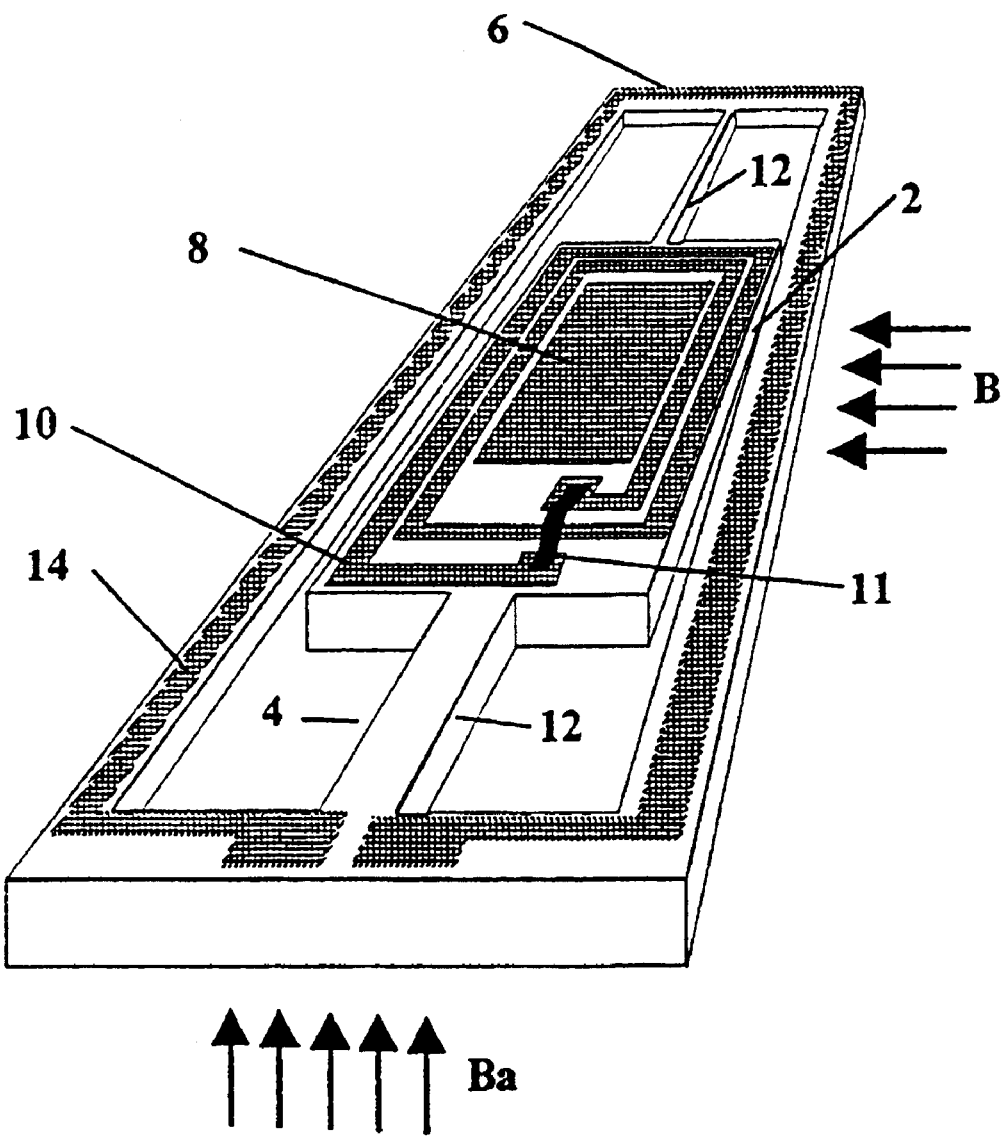
FIG. 1 depicts an embodiment of the novel microscanner.

As depicted in the embodiment illustrated in FIG. 1, the novel device has three main sub-systems: a rotor 2, a suspension system 4, and a stator 6. The rotor 2 includes mirror 8 and closed-loop coil 10. As illustrated in FIG. 1, closed-loop coil 10 comprises multiple turns, with the two ends of the coil connected by jumper 11. Coil 10 may also comprise but a single loop, as was done in the prototype embodiment described below. The suspension system 4 connects the rotor 2 to the stator 6. Suspension system 4, comprising torsion bars 12, has one principal degree of freedom, namely that allowing rotation or oscillation of the rotor about the axis of the torsion bars under torque. The stator 6 is a frame that supports the moving parts, the suspension system 4 and the rotor 2. Coil 14 for inductively coupling a power supply (not illustrated) to the coil 10 of the rotor (in the case of amplitude-modulation excitation) may optionally be part of the stator (as depicted in FIG. 1), or it may be a discrete device, external to the inductive micro scanner.

Figure 2:
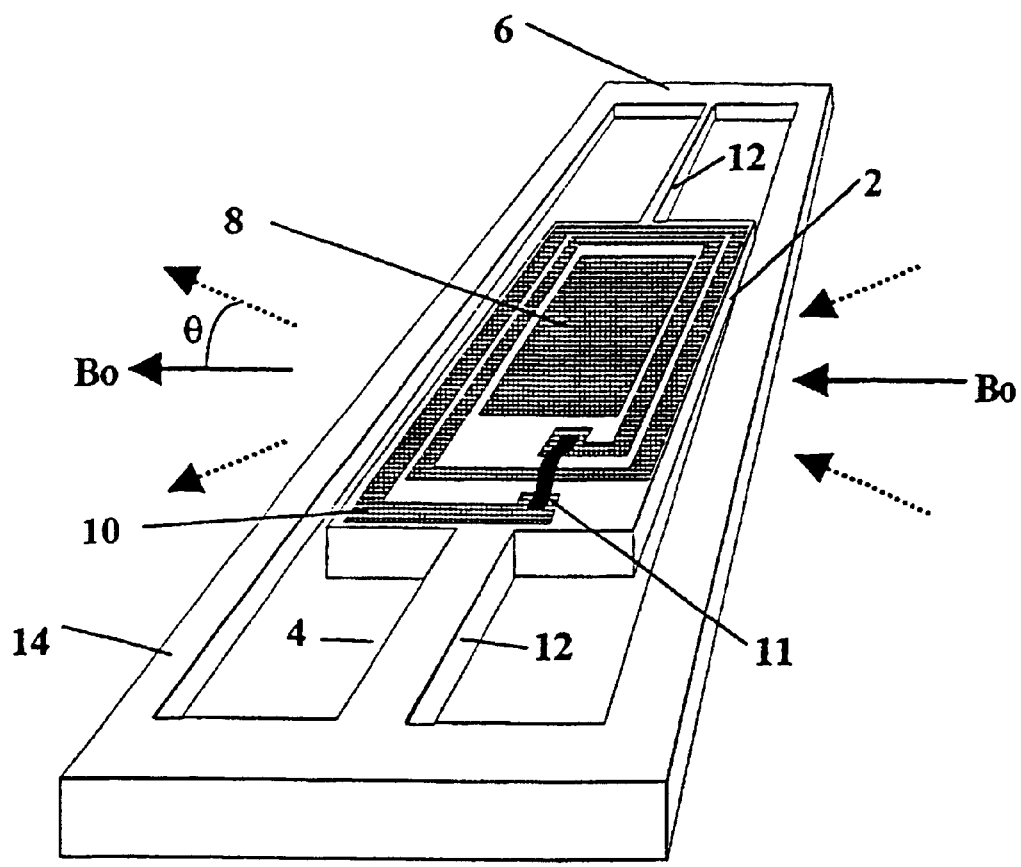
FIG. 2 illustrates the same device as depicted in FIG. 1, excited by a rotating magnetic field.
Figure 3:
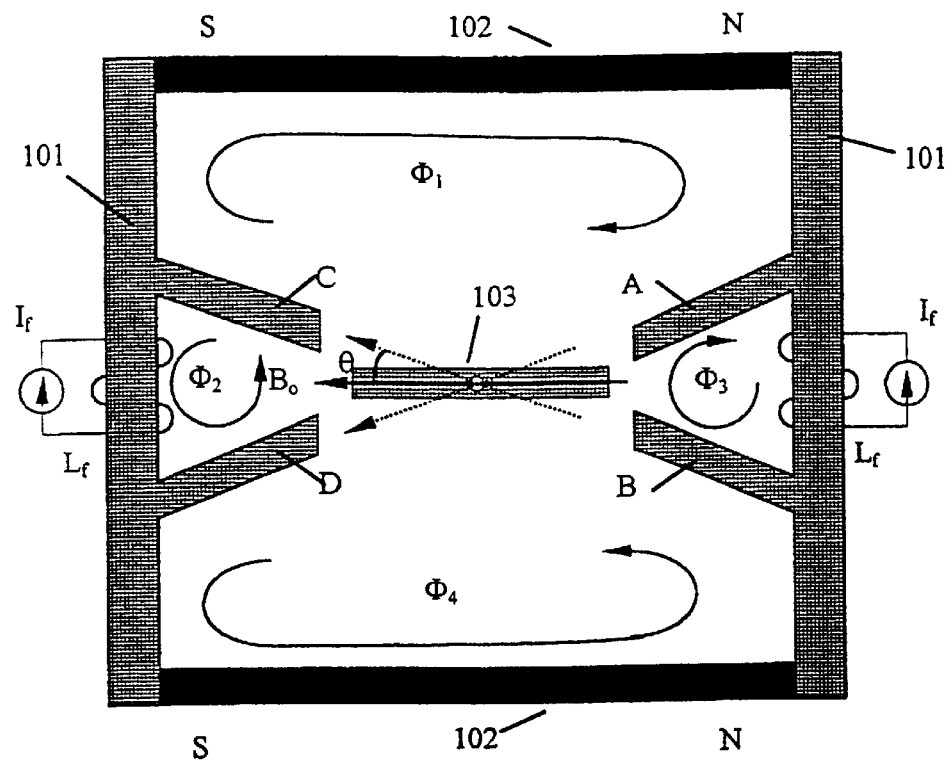
FIG. 3 depicts an external magnetic circuit to generate a rotating magnetic field.

FIG. 2 illustrates the same device, excited by a rotating magnetic field $B_o$. The rotating magnetic field may be generated by an external magnetic circuit such as that shown, for example, in FIG. 3. In FIG. 3, a magnetic field generated by permanent magnets 102 is directed by polar pieces 101 to rotor 103. The flow of current $I_f$ in the coils $L_f$ tilts the direction of the resulting magnetic field $B_o$.

By analogy to nomenclature used for conventional electric motors, the rotor may sometimes be referred to as the "armature," and the external magnets and external coil may sometimes be referred to as the "field."

For constant direction, amplitude-modulated magnetic field excitation, the field's coil 14 creates an alternating magnetic field $B_2$ that induces an electric current in coil 10 of armature or rotor 2. The current from the armature coil interacts with an external magnetic field (preferably a constant external magnetic field B, generated by external magnets not illustrated), producing a torque that twists rotor 2 around the axis of torsion bars 12. If coil 10 has n turns and area A, then the induced voltage E in coil 10, caused by magnetic field of induction $B_a$, is given by $$E = -nA(dB_a/dt)$$

For the case of rotating magnetic field excitation (e.g., FIG. 2), the change in the excitation magnetic field $B_o$ direction changes the magnetic flux coupling the rotor's coil, and that magnetic flux change induces a voltage E in the rotor's coil, producing an electric current I on the coil that interacts with the magnetic field $B_o$ to produce a deflection torque that twists rotor 2 around the axis of torsion bars 12. If coil 10 has n turns and area A, then the induced voltage E in coil 10, caused by induction magnetic field $B_o$ whose propagation direction forms an angle θ with the plane of the rotor's coil, and which propagation direction changes with time, is given by $$E = -nB_oA\, d(\sin(\theta))/dt$$

Assuming that the rotor's coil has negligible inductance, and that its resistance is $R_2$, then the induced electric current is:

$$I = E/R_a$$

If desired, power may be supplied to the rotor's coil by generating a very high frequency magnetic field $B_a$ on the field's coil, with the electric current thus induced in the armature's coil rectified by an on-board electronic circuit, and the resulting electrical energy may be stored in an on-board capacitor. An on-board electronic control circuit can generate from that stored energy an electric current to apply to the rotor's coil at a convenient frequency. The rotor's coil would then conduct both a high-frequency current, induced by the field's coil, and an lower-frequency current, generated by the on-board power supply and control electronic circuits. The influence of the high frequency current on the mechanical behavior of the rotor will be negligible if its frequency is much higher than the mechanical resonance frequency of the device. An advantage to this approach is a more efficient coupling between the field and the armature coils, even if the field coil has only a small number of turns.

If the external magnets have a constant magnetic induction B, then the torque I' acting upon the rotor is:

$$I' = nBIA\cos(\theta)$$

where θ is the deflection angle of the rotor.

The rotor's moment of inertia J and the suspension system's rigidity constant k are functions of the material properties and geometries used. The device's resonance frequency is $$\omega = (k/J)^{0.5}$$

The resonance frequency of the device may be dynamically changed by adding displaceable bodies on the rotor, for example small masses that have only one degree of displacement freedom and that, when moved, change the moment of inertia of the rotor, thereby changing the resonance frequency of the device. The masses may be moved spontaneously by the centripetal acceleration of the rotor, when attached to a restoring spring; or they may be moved by an actuator, for example an electrostatic actuator or an electromagnetic actuator. The resonance frequency of the device may also be tailored by the permanent addition or subtraction of small amounts of mass to or from the rotor. Mass may be added, for example, by applying droplets of polymer with an ink-jet printer head. Mass may be subtracted, for example, by vaporization of small quantities of the rotor by a laser beam.

Figure 4:
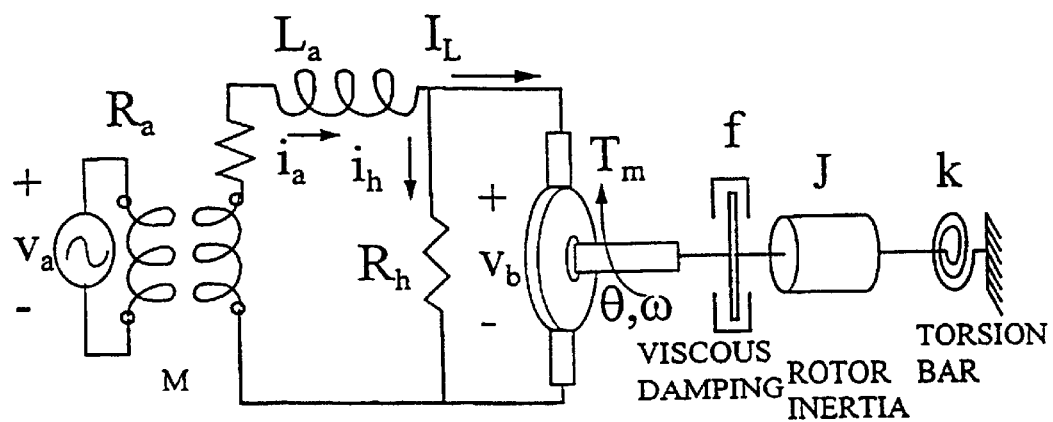
FIG. 4 schematically depicts the electromechanical parts of the novel inductive microscanner.

FIG. 4 schematically depicts the electromechanical parts of the novel inductive microscanner as ideal electromechanical elements. The dynamics of the device may be mathematically modeled using, for example, the general principles for DC electric motors presented in T. Kenjo, "Permanent Magnet and Brushless DC Motors" (1985), adapted to account for an elastic suspension system in place of a free-rotating axis, and for inductive coupling between the power supply and the moving coil.

A current $i_f$ is applied to the primary inductor coil, which is coupled to the rotor coil 10 by mutual inductance M. The inductance of moving coil 10 is $L_a$, and its electric resistance is $R_a$. The induced electric current $i_a$ flows through the series circuit $L_a$ and $R_a$. (The parasitic capacitance of the coil has been neglected.) The interaction between the electric current $i_a$ and the external magnetic field B produces a torque $T_m$ that acts on the moment of inertia J of rotor 2, on the viscous damping f produced by the air surrounding the rotor, and on the torsion bars of elastic constant k.

The four principal causes of energy loss from the armature are: (1) Joule heating due to the armature's resistance $R_a$, i.e., $Ri_a^2$, (2) work done to move the rotor in the air; (3) parasitic electric currents in the conducting parts of the rotor, e.g., the coil and the mirror, caused by the interaction of the moving parts with the external magnetic field B; and (4) mechanical losses from the torsion bar's hysteresis, which are proportional to the oscillation frequency. Causes 2 and 3 are both proportional to the square of the angular velocity of the rotor $w^2$, and can be represented by a resistance $R_h$ parallel to the counter-electromotive force $v_b$ that is generated by the movement of the armature coil in the magnetic field B. In this model the armature current $i_a$ may be divided in two currents, $i_h$ and $i_L$, where $i_h$ is the current that represents the energy losses in $R_h$, and $i_L$ represents the energy that is effectively converted to torque $T_m$ on the rotor.

A prototype embodiment has been built in silicon using the micromachining techniques of K. Petersen, "Silicon as a Mechanical Material," *Proc.* IEEE, vol. 70, pp. 420–457 (1982) ; E. Bassous, "Fabrication of Novel Three-Dimensional Microstructures by the Anisotropic Etching of (100 and (110) silicon," IEEE *Trans. on Electron. Devices*, vol. ED-25, pp. 1178–1185, (1978); K. Bean, "Anistropic Etching of Silicon," IEEE *Trans. on Electron. Devices*, vol. ED-25, pp. 1185–1193 (1978); and J. Price, "Anistropic Etching of Silicon with KOH-$H_2O$-Isopropyl Alcohol," ECD *Semiconductor Silicon*, pp. 339–353 (1973). The overall dimensions of the prototype (i.e., of the periphery of the stator) were 25 mm×12.5 mm×9 mm; all components were 300 µm thick; the rotor was a square, 5×5 mm; and the torsion bars were 7.5 mm long. The tops of the torsion bars were 100 µm wide, and the bottoms of the torsion bars were slightly wider due to anisotropic method used to etch the silicon crystal (discussed further below).

KOH was used to etch the prototype. The substrate was a single crystal Si <100>, coated with a 1 µm $SiO_2$ film, a 200 Å Cr film, and a 900 Å Au film. The Au film was used both as the conductive material for the coils, and as the light-reflecting material for the mirror, while the Cr film was used as an adhesion layer between the Au film and the $SiO_2$ film. The film coatings were lithographed in a pattern corresponding to the rotor design, and the wafer was etched in a KOH:isopropanol:$H_2O$ solution (mass proportions 5:4:16) at 80° C. until the wafer had been etched through.

Figure 5:
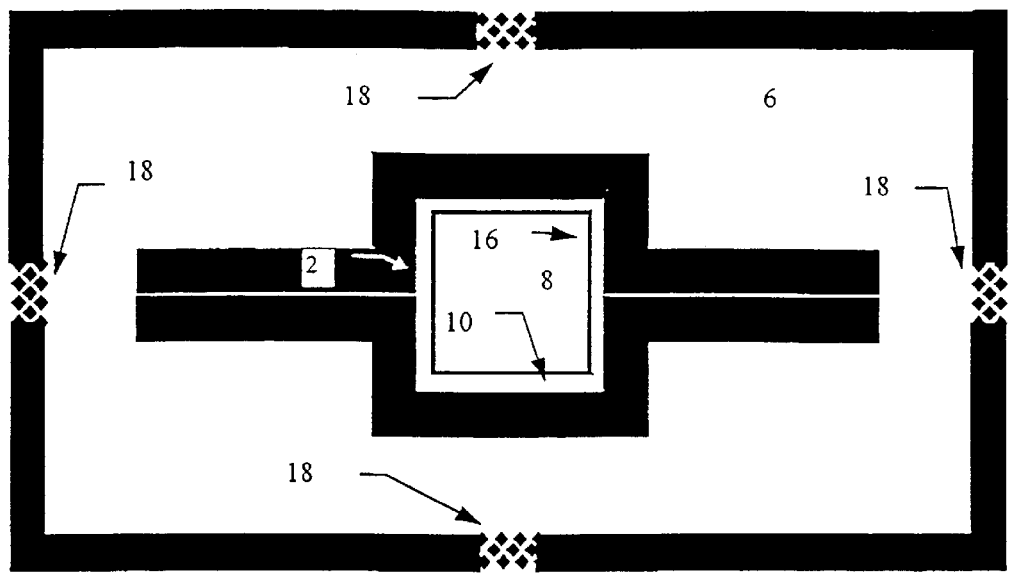
FIG. 5 illustrates insulating grooves etched between the single-turn rotor coil and the conductive surface of the mirror, so that only one lithography mask was needed to manufacture the device.

As illustrated in FIG. 5, insulating grooves 16 were etched between the single-turn rotor coil 10 and the conductive surface of the mirror 8, so that only one lithography mask was needed to manufacture the prototype device. The mask defined both these insulating grooves, and the through-the-wafer grooves that defined the rotor 2, the suspension system 4, the stator 6, and the bridges 18 to maintain the devices on the wafer 20 after the wafer 20 had been etched (discussed further below).

As the wafer was sculpted from the front by this etching process, thereby defining the structures of the device, the wafer was at the same time being thinned from the back, which was entirely exposed to the KOH etchant because the $SiO_2$ coating on the back had previously been removed.

Figure 6A:
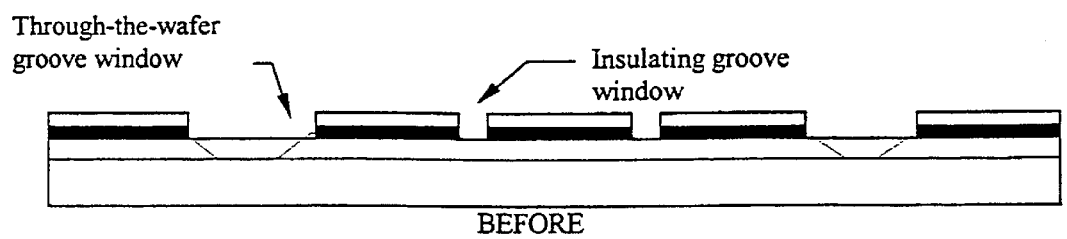
FIGS. 6(a) and 6(b) illustrate schematically an anisotropic etching process that may optionally be used in constructing the devices of this invention.
Figure 6B:
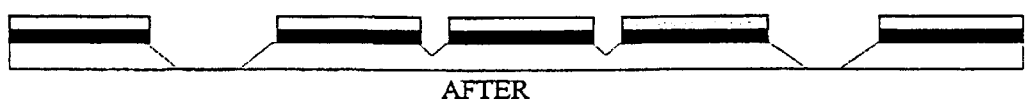

It was possible to use a single lithography mask both to define the electric circuits on the conductive film layer, and to open "etching windows" through the coating films due to the anisotropic characteristic of the etching process used. In the anisotropic etching process, a rectangular etch window with small dimension X, aligned with the crystal <111> planes, produces a triangular groove $2^{1/2}X$ deep, after which depth the etching process essentially stops. See FIGS. 6(*a*) and 6(*b*), illustrating this anisotropic etching process schematically. A narrow window around the mirror area produced insulating grooves 16, defining the rotor's coil by electrically insulating the coil 10 from the mirror 8. In the prototype device, the insulating grooves were 20 µm wide by 14 µm deep (compared to a 100 µm width for the tops of the torsion bars). Use of a single lithography mask and a single etching step simplifies production of the devices and reduces costs.

As was done in constructing the prototype, it is often desirable to simultaneously thin the wafers and etch the device's features. The resonance frequency of the device may be customized by selecting a thickness that may not correspond to the thickness of readily available silicon wafers. Furthermore, even were thinner wafers readily available, handling thinner wafers would be more likely to cause inadvertent breakage.

Two related difficulties in fabricating the novel devices have been overcome, namely the tendency of the devices to fall into the etching reactor as the etching process is completed, and the fragility caused by the devices' thin dimensions, which can cause them to break when retrieved form the reactor. Both problems were overcome by adding auxiliary bridge structures 18 as depicted in FIG. 5, thin lattices placed at a few points along the periphery of the stator, to sustain the devices on the wafer 20 after the etch windows had been etched through the wafer. The device and the wafer may then be handled together as a unit, reducing the risk of falling and breakage. The device may later be separated from the wafer by breaking the bridges with a fine stylus. After separation from the wafer the devices were fixed to a mounting base for safer handling, and were then positioned in a test setup.

For testing, the prototype device was positioned between permanent magnets generating a 550 gauss field. A 70-turn inductor (40 mm long, 4×8 mm area, on a 49 mm long ferrite core) was positioned behind the rotor as a distance of 0.5 mm, and was excited with a 100 mA sinusoidal electric current at 1606 Hz (the predicted resonance frequency of the prototype device). A laser beam reflected from the mirror of the inductive microscanner was deflected at a frequency of 1606 Hz, with a peak-to-peak deflection of 23 mm on a surface positioned 1600 mm from the mirror, corresponding to a deflection angle of approximately 0.4° peak-to-peak. The magnitude of deflection varied with the current applied to the inductor. The device was maintained oscillating in this manner for over 10 hours, when the test run was stopped. The deflection may be increased to a 10° peak-to-peak deflection angle or greater by increasing the magnitude of the constant magnetic field, the magnitude of the alternating magnetic field, or both; and by reducing the resistance of the rotor coil. Preferred mechanical deflection angles (i.e., the deflection angle of the moving mirror) are greater than or equal to about 10 degrees peak-to-peak. The following optional changes may be made to the device: (1) A more compact magnetic circuit to generate the external magnetic field, for example using rare earth permanent magnets positioned close to the rotor (e.g., 2 mm or closer). The desired induction field is above about 2000 gauss. (2) A packaging system that better protects the device from mechanical shocks on handling, for example an external layer of a shock-absorbing material such as rubber.

The following capabilities are unique to the novel device, due to the microfabrication techniques used to make it: (1) An on-board electronic control system may be employed. The control electronics may be built directly on the same silicon wafer as the deice, avoiding bulky, expensive and power-hungry discrete controllers. (2) The moving rotor may be built with a honeycomb or similar structure (i.e., a two-dimensional or three-dimensional mesh, or a plate with pores), to give it high mechanical strength with a smaller moment of inertia for a given size, permitting higher operating frequencies. Low-cost devices may thus be built operating at frequencies of 20 kHz or higher. Power consumption is less than 2 Watts, the same order of magnitude as the best previously available mechanical scanners, and could be 1 Watt or even less.

In a preferred embodiment, a feedback system is used, preferably fabricated on the same wafer, to maintain oscillations at the desired frequency. The feedback system monitors the back-electromotive force induced on the coil by its oscillations, and fires a current or voltage pulse on the same coil, synchronously with the existing oscillations of the device. The feedback system eliminates the need to tune the drive circuit, and eliminates the need for a position or velocity feedback transducer. The field's coil induces a voltage in the armature's coil. The voltage on the armature's coil produces an electric current in the armature's coil. The armature coil current interacts with the DC magnetic field, generating a torque on the armature. The armature oscillates under that torque. The movement of the armature coil inside the DC magnetic field generates a voltage on the armature coil, a voltage that is opposed to the voltage induced in the armature by the field coil. That contrary voltage is detected and used to measure the velocity and position of the armature (i.e., the position of the mirror), the better to control the device's performance.

Figure 7:
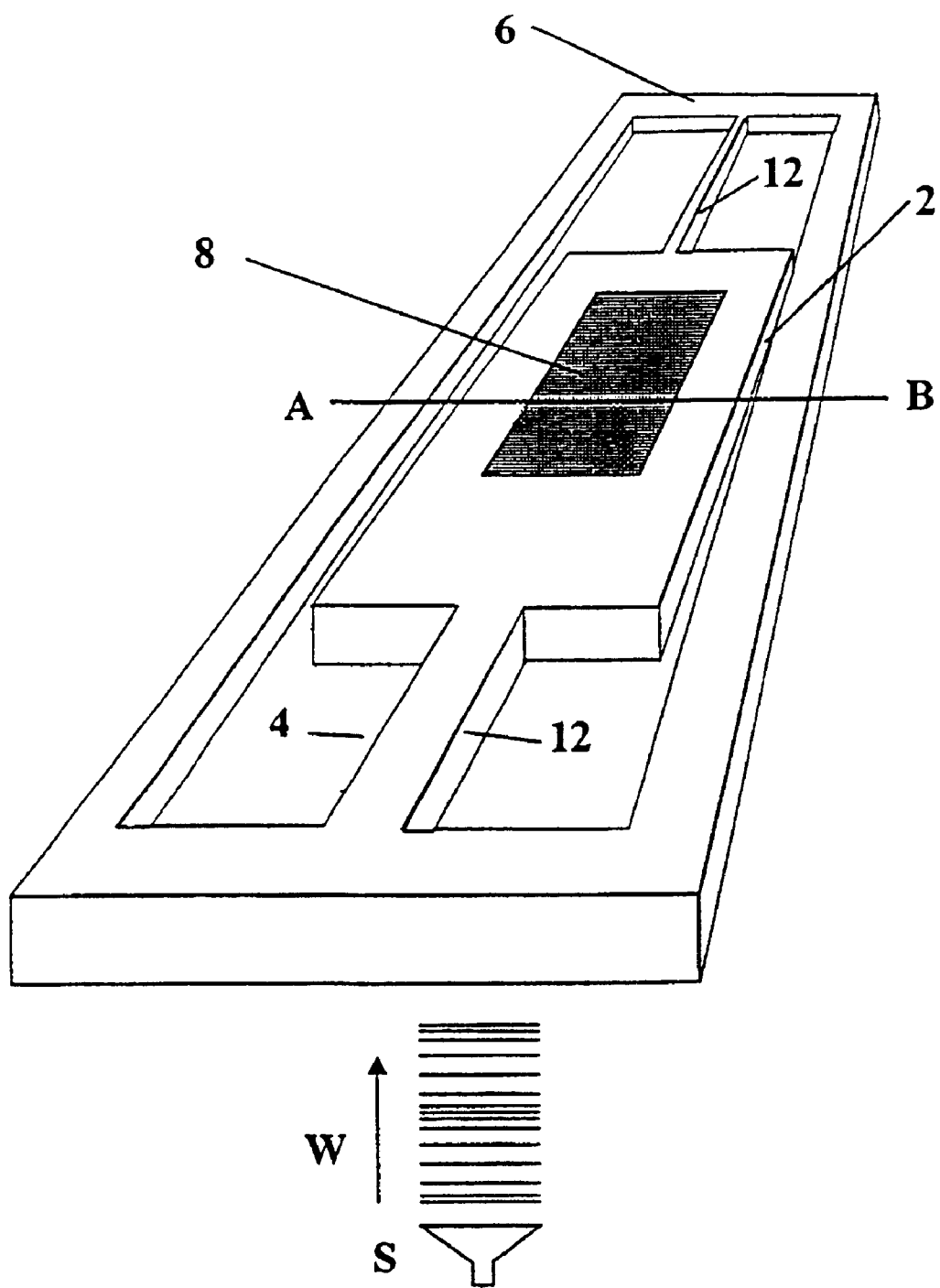
FIG. 7 illustrates an alternative embodiment, in which the oscillating torque is produced by acoustic waves.
Figure 8A:
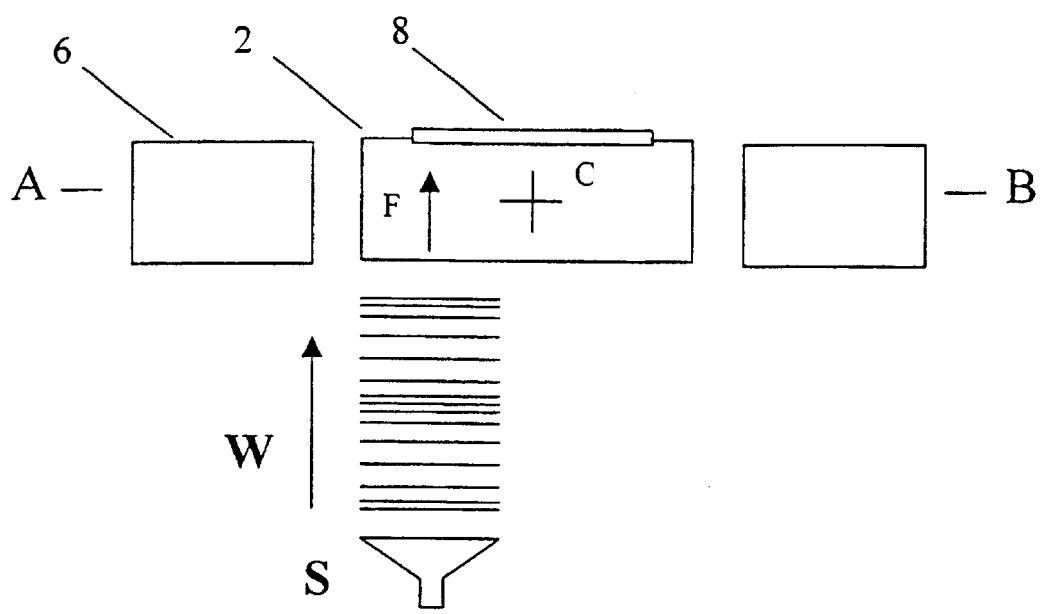
FIGS. 8(a) and 8(b) illustrate cross sections of the embodiment of FIG. 7.
Figure 8B:
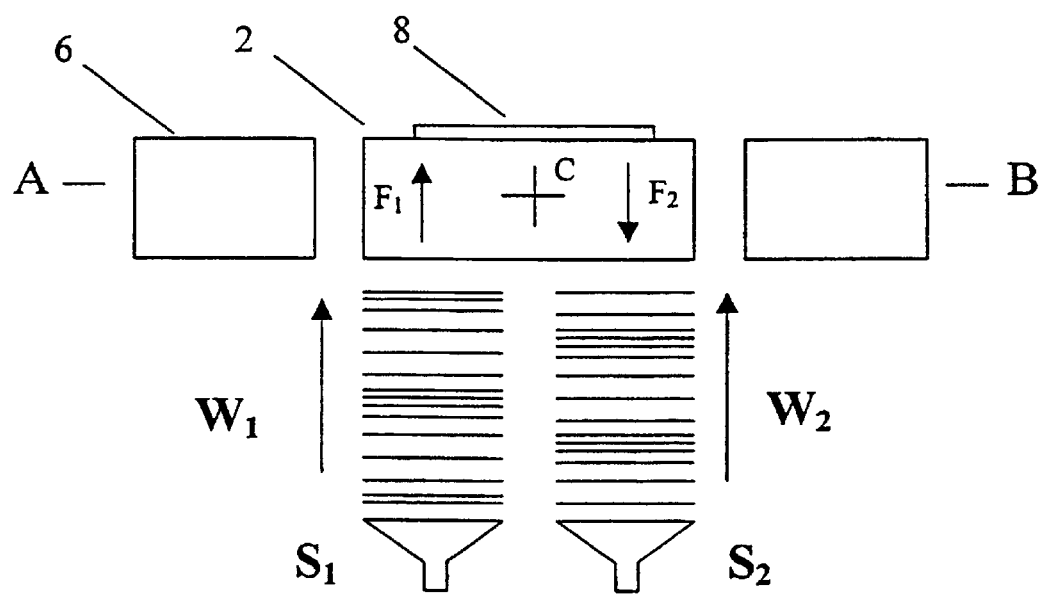

In an alternative embodiment illustrated in FIG. 7, the electric circuits and magnetic fields may be eliminated and replaced by an acoustic wave source whose frequency is the natural resonant frequency of the rotor, a higher frequency, or a lower frequency; preferably a harmonic or subharmonic frequency. As shown in FIG. 8($a$), the acoustic wave source S is placed off-center from the axis C of the rotor, so that the acoustic waves W produce an oscillating force F on one side of the rotor due to the pressure difference between the top and bottom of the rotor. The actuation force shown in FIG. 8($a$), is not symmetric, so a net (oscillating) vertical force on the entire rotor is produced, which can lead to undesired vertical displacement. This problem is remedied by using two symmetrically placed acoustic sources $S_1$ and $S_2$, as illustrated in FIG. 8($b$), with acoustic waves $W_1$ and $W_2$ of equal frequency and intensity, but 180° C. out-of-phase from one another. The resulting oscillating forces $F_1$ and $F_2$ on opposite sides of the rotor are equal in magnitude but opposite in direction. Thus there is an alternating torque but no net vertical force on the rotor, causing oscillation of the rotor without vertical displacement.

This acoustic wave approach has been successfully demonstrated in a prototype. An exciting acoustic frequency of 2832 Hz produced a peak-to-peak deflection of 1.7° in a rotor whose construction was generally similar to that of the magnetic induction prototype described above. The rotor was 5 mm ×5 mm; the torsion bars were 5 mm long; and the thickness was 220 $\mu$m. The acoustic wave source was a 32 Ohm earphone positioned 2 mm from the bottom of the rotor, and 2 mm off-center from the axis of the rotor, excited by a 20 Volt peak-to-peak sine wave.

The complete disclosures of all references cited in this specification are hereby incorporated by reference. In the event of an otherwise irreconcilable conflict, however, the present specification shall control.

What is claimed:

1. A micromechanical scanner comprising a rotor, a suspension system, and a stator; wherein:
   (a) said rotor comprises a rigidly affixed mirror, and said rotor is not adapted to be directly connected to an electrical power supply or to an electrostatic power supply;
   (b) said suspension system connects said rotor to said stator, wherein said suspension system permits rotational deflection of said rotor when torque is applied to said rotor;
   (c) said stator comprises a frame to support said suspension system, and thereby to support said rotor;
   (d) said rotor is adapted to oscillate rotationally in response to an external actuation torque produced by an oscillating magnetic field;
   (e) said rotor comprises an electrically conducting coil, wherein said coil is not adapted to be directly connected to an electrical power supply, and wherein an electric current may be induced in said coil in response to a varying magnetic field;
      whereby, in the presence of first and second magnetic fields, wherein the second magnetic field is an alternating or oscillating magnetic field, the second magnetic field induces an alternating electric current in said coil; whereby the interaction of the induced alternating electric current and the first magnetic field produces an alternating torque on said rotor; whereby said rotor oscillates.

2. A micromechanical scanner as recited in claim 1, wherein said rotor contains open spaces; whereby the moment of inertia of said rotor is smaller than would be the moment of inertia of an otherwise identical rotor in which the open spaces were filled;
   whereby the resonant frequency of said rotor is higher than the resonant frequency of the otherwise identical rotor; whereby the oscillation frequency of said rotor is higher than would be the oscillation frequency of the otherwise identical rotor.

3. A micromechanical scanner as recited in claim 2, wherein said rotor comprises a honeycomb structure, a mesh, or a plate with pores.

4. A micromechanical scanner as recited in claim 1, wherein the resonant frequency of said rotor is at least 10 kHz.

5. A micromechanical scanner as recited in claim 1, wherein the resonant frequency of said rotor is at least 12 kHz.

6. A micromechanical scanner as recited in claim 1, wherein the resonant frequency of said rotor is at least 15 kHz.

7. A micromechanical scanner as recited in claim 1, wherein the resonant frequency of said rotor is at least 20 kHz.

8. A micromechanical scanner as recited in claim 1, additionally comprising one or more displaceable bodies to allow the resonant frequency of said rotor to be adjusted.

9. A micromechanical scanner as recited in claim 8, wherein the positions of said displaceable bodies may be adjusted by the centripetal acceleration of said rotor.

10. A micromechanical scanner as recited in claim 8, additionally comprising a micromechanical actuator to adjust the positions of said displaceable bodies.

11. A micromechanical scanner as recited in claim 1, wherein said rotor, said suspension system, and said stator are all formed on one or more elements selected from the group consisting of silicon, metal, ceramic, or polymer.

12. A micromechanical scanner as recited in claim 1, wherein said scanner is formed on a silicon wafer, and wherein electronic control elements for said scanner are formed on the same silicon wafer.

13. A micromechanical scanner as recited in claim 1, additionally comprising first and second permanent magnets or electro magnets, adapted to produce the first and second magnetic field, respectively.

14. A micromechanical scanner comprising a rotor, a suspension system, and a stator; wherein:
  (a) said rotor comprises a rigidly affixed mirror, and said rotor is not adapted to be directly connected to an electrical power supply or to an electrostatic power supply;
  (b) said suspension system connects said rotor to said stator, wherein said suspension system permits rotational deflection of said rotor when torque is applied to said rotor;
  (c) said stator comprises a frame to support said suspension system, and thereby to support said rotor;
  (d) said rotor additionally comprises an electrically conducting coil, as rectifier, an electrical energy storage element, and an electronic control; wherein said coil is not adapted to be directly connected to an external electrical power supply; wherein said rectifier and said coil are adapted, in response to a first magnetic field oscillating at a frequency substantially higher than the resonant frequency of said rotor, to rectify the voltage induced in said coil by the first magnetic field, and to store electrical energy in said storage element; wherein said electronic control is adapted to convert electrical energy in said storage element to an alternating electric current supplied to said coil; whereby the interaction of the alternating electric current and a second constant magnetic field produces an alternating torque on said rotor; whereby said rotor oscillates.

15. A micromechanical scanner as recited in claim 14, wherein said rotor contains open spaces; whereby the moment of inertia of said rotor is smaller than would be the moment of inertia of an otherwise identical rotor in which the open spaces were filled;
  whereby the resonant frequency of said rotor is higher than the resonant frequency of the otherwise identical rotor; whereby the oscillation frequency of said rotor is higher than would be the oscillation frequency of the otherwise identical rotor.

16. A micromechanical scanner as recited in claim 15, wherein said rotor comprises a honeycomb structure, a mesh, or a plate with pores.

17. A micromechanical scanner as recited in claim 14, wherein the resonant frequency of said rotor is at least 10 kHz.

18. A micromechanical scanner as recited in claim 14, wherein the resonant frequency of said rotor is at least 12 kHz.

19. A micromechanical scanner as recited in claim 14, wherein the resonant frequency of said rotor is at least 15 kHz.

20. A micromechanical scanner as recited in claim 14, wherein the resonant frequency of said rotor is at least 20 kHz.

21. A micromechanical scanner as recited in claim 14, additionally comprising one or more displaceable bodies to allow the resonant frequency of said rotor to be adjusted.

22. A micromechanical scanner as recited in claim 21, wherein the positions of said displaceable bodies may be adjusted by the centripetal acceleration of said rotor.

23. A micromechanical scanner as recited in claim 21, additionally comprising a micromechanical actuator to adjust the positions of said displaceable bodies.

24. A micromechanical scanner as recited in claim 14, wherein said rotor, said suspension system, and said stator are all formed on one or more elements selected from the group consisting of silicon, metal, ceramic, or polymer.

25. A micromechanical scanner comprising a rotor, a suspension system, and a stator; wherein:
  (a) said rotor comprises a rigidly affixed mirror, and said rotor is not adapted to be directly connected to an electrical power supply or to an electrostatic power supply;
  (b) said suspension system connects said rotor to said stator, wherein said suspension system permits rotational deflection of said rotor when torque is applied to said rotor;
  (c) said stator comprises a frame to support said suspension system, and thereby to support said rotor:
  (d) said rotor is adapted to oscillate rotationally in response to an external actuation torque produced by acoustic waves.

26. A micromechanical scanner as recited in claim 25, additionally comprising an acoustic wave source whose frequency is a harmonic or subharmonic of the resonant frequency of the rotor, positioned relative to said rotor so that acoustic waves from said source induce an oscillating torque in said rotor.

27. A micromechanical scanner as recited in claim 25, additionally comprising first and second acoustic wave sources, each of whose frequencies is an integral multiple or submultiple of the resonant frequency of the rotor, wherein the positions and phases of said acoustic wave sources relative to said rotor are such that acoustic waves from said acoustic wave sources induce an oscillating torque in said rotor, but no net force on said rotor; whereby said rotor oscillates rotationally about an axis in response to the acoustic waves, but has no substantial displacement other than the oscillation about the axis.

28. A micromechanical scanner as recited in claim 25, wherein said rotor contains open spaces; whereby the moment of inertia of said rotor is smaller than would be the moment of inertia of an otherwise identical rotor in which the open spaces were filled;

whereby the resonant frequency of said rotor is higher than the resonant frequency of the otherwise identical rotor; whereby the oscillation frequency of said rotor is higher than would be the oscillation frequency of the otherwise identical rotor.

29. A micromechanical scanner as recited in claim 28, wherein said rotor comprises a honeycomb structure, a mesh, or a plate with pores.

30. A micromechanical scanner as recited in claim 25, wherein the resonant frequency of said rotor is at least 10 kHz.

31. A micromechanical scanner as recited in claim 25, wherein the resonant frequency of said rotor is at least 12 kHz.

32. A micromechanical scanner as recited in claim 25, wherein the resonant frequency of said rotor is at least 15 kHz.

33. A micromechanical scanner as recited in claim 25, wherein the resonant frequency of said rotor is at least 20 kHz.

34. A micromechanical scanner as recited in claim 25, additionally comprising one or more displaceable bodies to allow the resonant frequency of said rotor to be adjusted.

35. A micromechanical scanner as recited in claim 34, wherein the positions of said displaceable bodies may be adjusted by the centripetal acceleration of said rotor.

36. A micromechanical scanner as recited in claim 34, additionally comprising a micromechanical actuator to adjust the positions of said displaceable bodies.

37. A micromechanical scanner as recited in claim 25, wherein said rotor, said suspension system, and said stator are all formed on one or more elements selected from the group consisting of silicon, metal, ceramic, or polymer.

* * * * *